Sept. 15, 1970   R. J. HARRIS, SR., ET AL   3,528,641

TUBULAR VALVE

Filed April 15, 1968

United States Patent Office 3,528,641
Patented Sept. 15, 1970

3,528,641
TUBULAR VALVE
Rano Joseph Harris, Sr., 1945 Carolyn Sue Drive, and Rano Joseph Harris, Jr., 9880 Riveroaks St., both of Baton Rouge, La. 70815
Filed Apr. 15, 1968, Ser. No. 721,338
Int. Cl. F16k *31/00*
U.S. Cl. 251—340
10 Claims

ABSTRACT OF THE DISCLOSURE

A valve for containing and releasing fluids held under high pressures, e.g. as in a bomb. The valve body is of tubular shape and contains a tubular stem, provided with a side opening, slidably mounted within the valve body. The tubular stem is also provided with guide means, and the forward end thereof is mounted tightly within a lubricated tubular packing, preferably a self-lubricated packing, located at the forward end of the valve body. The side opening of the tubular stem, which is in wiping contact with the packing, can be projected or retracted through the packing to open or close the valve. The tubular stem via engagement through a slot opening in the valve body to the guide means, is responsive to rotary knob means located upon and threadedly engaged to the exterior of the valve body.

---

This invention relates to new and improved valves, especially valves capable of holding and releasing fluids contained under high pressures. In particular, it relates to valves and valve combinations of the type wherein a tubular stem, provided with a side opening, is mounted within a tubular body. The only path for ingress or egress of fluid is through the side opening, and the opening is provided adjacent a lubricated packing for wiping contact to clean the stem as well as to open and close the valve. The invention further relates to a new and novel guide means for ease of movement of the stem, said means eliminating the requirement of rigid precision fits.

Numerous problems and difficulties have been encountered in providing valves capable of containing liquids and gases, especially at high pressures.

A significant problem is that related to keeping the fluid outlet portion of a valve free of particles of dirt, grit or other contaminants which may block, or tend to block, the outlet or even obstruct the means of opening and closing the outlet. This can be particularly troublesome when a valve is stored or used in normal industrial environments which often leave much to be desired by way of good housekeeping. Occasionally, also, a small extraneous particle, or particles, contained within the stored fluid can block the fluid outlet and create problems. This is particularly so where the release mechanism is such that direct force or impact therefrom acts to grind, press or wedge the particle within the outlet portion of the valve.

Another, and even more significant problem, is that relating to the requirement of precision fits in order to provide operability.

It is the primary objective of the present invention to overcome these and other problems and difficulties and to provide reliable valves, i.e., valves which do not readily leak and which are capable of retaining fluids under pressures ranging from several hundred to several thousands of pounds per square inch, but which fluids can be readily released through the valves, slowly or rapidly, when desired.

It is a further objective to provide valves of this character which are relatively simple, easily assembled or disassembled and relatively inexpensive to manufacture.

A specific objective is to provide valves with highly efficient sealing and actuating means which make them admirably suitable for an endless variety of applications.

These objects, and others, are accomplished in accordance with the present invention which contemplates linear valve structures wherein is provided a generally tubular valve body within which is slidably fitted a hollow or tubular stem, closed at an end and provided with a side opening at or near the closed end. The stem is affixed within guide means axially movable within the tubular body. The guide means is capable of at least limited movement through the tubular body, and a portion thereof is movable in parallel relationship with a slot opening provided in the tubular body.

Within an end of the tubular body is provided a lubricated packing with an opening therethrough. The opening of the packing is axially aligned with the opening through the valve body and the side opening of the stem. The stem is fitted snugly through the opening of the packing. It is movable therein while in close contact with the packing. The stem can be withdrawn into the packing to close off the side vent opening, or thrust outside the packing to open the valve by exposure of the side opening.

The outer portion of the tubular body is externally threaded and provided with a member threadably engaged to the tubular body and rotatable about the central axis or opening through the tubular body. The rotatable member is keyed or otherwise engaged, through the slot opening, to the guide means so that linear movement thereof back and forth along the valve body carries with it the stem to open and close the valve. On the other hand, the rotatable member can be caused to remain in fixed linear relationship relative to the valve body, but threadably connected to the guide means so that rotational movement thereof causes linear movement of the guide means, and consequently linear movement of the hollow stem within the valve body.

The invention will be better understood by reference to the following detailed description of specific and preferred embodiments, and to the attached drawings to which the reference is made in the description.

Figure 3:
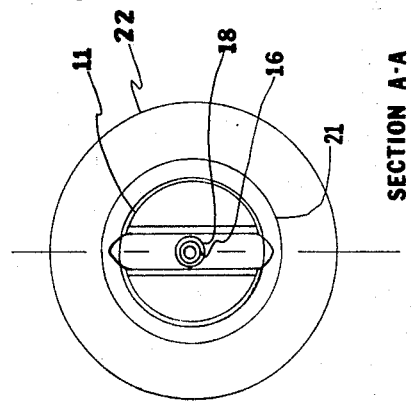
FIG. 3 is a view generally similar to FIG. 1, except that the valve is shown in closed position.

Referring to the figures is shown a valve 10 comprising generally a rigid tubular body 11, upon each end of which is fitted adaptors 12, 13 provided with internal openings, or receptacles, to accommodate tubular-shaped packings 14, 15. A central opening is provided through each adaptor 12, 13 and, when positioned, these openings are axially aligned upon the opening or bore through the center of tubular body 11. A hollow or tubular stem 16, with a front side opening 19, is fitted slidably within the axial openings provided through the tubular body 11, adaptors 12, 13 and packings 14, 15.

In its preferred form the tubular body 11 is defined by an enclosing metal wall, partially closed at the ends to leave openings 111, 112. These openings align with the openings 122, 132 of metal adaptors 12, 13, each of similar size, shape and function, which can be adjoined to the tubular body 11 by any convenient means. The surfaces of the adaptors 12, 13 are planed in shape for ready removal or assembly with conventional tools. Suitably, the tubular body 11 and adaptors 12, 13 are constructed of metal, e.g., brass, bronze or steel, the adaptors 12, 13 are internally threaded and secured to the ends of the tubular body 11 via external threads mating therewith. The adaptors and tubular body could also comprise a unitary member, if desired.

Figure 2:
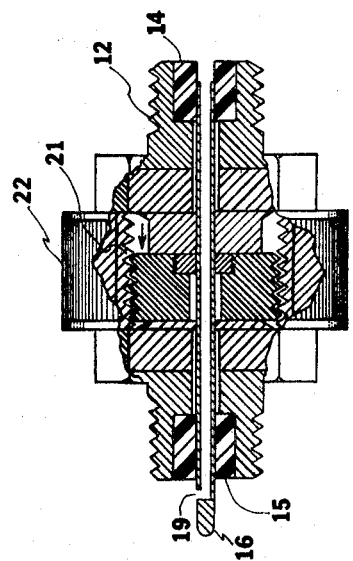
FIG. 2 is a cross-sectional view of FIG. 1 showing certain details of the preferred guide means and movable stem.
Figure 1:
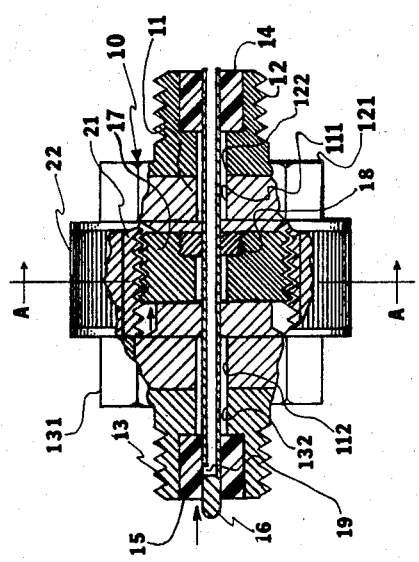
FIG. 1 is a partial sectional view of the more essential and preferred features of the linear valve, this view showing in particular a movable tubular stem in the central portion thereof which opens and closes the valve. In this figure the valve is shown in closed position.

The lubricated packings 14, 15 are preferably of Teflon (polytetrafluoroethylene), these providing for free axial movement of tubular stem 16 to open and shut off pressurized fluid from a source. The tubular stem 16 is provided with a side opening 19 which can be retracted into the packing 15 (FIG. 1) to close the valve 10, or projected outside the packing 15 to open valve 10 (FIG. 2). In this fashion, pressurized fluid from a source, e.g., a bomb container, can flow through the tubular stem 16 when the opening is uncovered by thrust of stem 16 outwardly, or closed when opening 19 is covered by withdrawal of the stem 19 into the packing 15. Withdrawal of stem 16 into the packing 15 completely isolates this member from exposure to a fluid supply to which the valve may be associated, e.g., a fluid filled bomb. Further, self-cleaning of the stem 16 results from the wiping effect created by sliding stem 16 into packing 15. Grit and solids particles are prevented from entering and possibly damaging packing 15.

The tubular stem 16 is axially movable within the tubular body 11 via action of an adjustably mounted knob 22 acting upon guide means 17 within which tubular stem 16 is rigidly mounted. The internal portion of tubular body 11 is thus conveniently provided with a sufficiently large opening to contain guide means 17 and permit sufficient linear movement thereof, and tubular stem 16, to open and close the valve in the aforesaid manner.

The knob 22, preferably a rotary mounted knob, can be engaged with the guide means 17 in any convenient manner, or in any of several ways. One method, e.g., is to provide a fixed stud or pin extending outwardly from the guide means for engagement with a slot located within the underside of a rotary mounted knob. The rotary mounted knob is threadably engaged to the exterior side of an extended tubular body so that the knob can be rotated and moved back and forth to produce linear movement of the guide means, and consequently linear movement of the tubular stem. In generally similar manner, the same can be accomplished when the guide means and adjustable knob are threadably engaged. In a preferred embodiment, a rotatable knob is mounted so that only linear motion of the guide means and stem is produced. The figures show the most preferred method of mounting. They also show a convenient manner of affixing the stem within the guide means, and in particular show an especially preferred type of guide means.

The tubular stem 16 is rigidly mounted within the guide means 17. Suitably, the tubular stem 16 is tightly fitted through an externally threaded member 18 for convenient replacement. The member 18 is threadably and rigidly engaged to guide means 17 via internal threads within an opening through guide means 17.

The adjustable knob 22 is conveniently constructed of two portions, via an external portion proper 22 with a knurled surface and an internal portion 21, the inside surface of which is threaded to engage external threads located on guide means 17. The external portion 22 of the knob is conveniently constructed of plastic, and the internal portion of metal, e.g., bronze, brass, or steel. The two portions 21, 22 are fitted tightly together to perform a unitary function in the operation of the valve 10. The knob 22 is mounted over the enlarged portion of the internal opening through tubular body 11 and lateral movement thereof is restricted by the proximity of portions 121, 131 of adaptors 12, 13. Rotation of knob 22 in one direction, and thence in another, thus produces lateral movement of guide means 17, and consequently stem 16, to close (FIG. 1) or open (FIG. 2) the valve 10.

An especially preferred embodiment of the present invention relates to the specific construction of threaded guide means 17 and the manner in which it is engaged with and rides within the threads of member 21. Referring to FIG. 3, section AA of FIG. 1, it will be observed that the sides of guide means 17 are planed, cut or beveled to provide a tapered cross-section. The tapering greatly reduced the amount of surface contact between the land portions of the threads of the two respective members. The restricted contact permits considerable lateral and vertical movement or wobbling of the guide means 17 within member 21. A loose threaded engagement is thus provided, and the apexes of the threaded portions of the guide means 17, located 180 degrees apart, do not contact or press against the upper solid portions providing the grooved surface. On rotation of the knob 22 the land portions only of the threaded surfaces come into contact and urge the movement of the guide means 17. In this manner, the force required to open and close the valve 10 is reduced. Dirt, grit or foreign material trapped within the threads is easily bypassed and provides little or no interference with rotation of the knob 22 and movement of guide means 17, and stem 16. In fact, material so trapped is, in most instances, ground to a harmless powder.

Even more importantly, the operability of the valve is not impaired by misalignments of the parts as can occur for any of several common reasons. Thus, the tubular stem 16 in normally axially aligned within the tubular body 11, resting upon the packings 14, 15. In movement, the lands of the threaded portions of the knob 22 and guide means 17 come into contact. If, however, the stem 16 should become slightly bent, the packings become misaligned or some other distortion occur, there is yet room for displacement of the guide means 17 within the threaded portion 21 of the knob and operability will not be impaired. Furthermore, this means that the normal requirement of high precision for the several parts of the device is lessened. The importance of these features is readily understood.

The several embodiments hereinbefore exemplified and described are illustrative. It is apparent that those skilled in the art can affect modifications, changes and equivalents without departing the spirit and scopt of the invention. Accordingly, applicants should be afforded a full range of equivalents as fall within the spirit and scope of the claims.

Having described the invention, what is claimed is:

1. A valve comprising
   an enclosing wall defining a tubular body, said tubular body being provided with external threads,
   a lubricated tubular shaped packing located within an end of the tubular body,
   a tubular stem slidably mounted within the tubular body, said tubular stem being closed at an end, and provided with a side opening near the closed end, which tubular stem is at all times fitted tightly within the tubular packing, and which side opening is extensible through the opening accorded within the tubular packing to the outside of the packing to open the passageway through the stem to the valve exterior,
   a slot opening within the wall of the tubular body parallel to the central opening accorded therethrough,
   guide means, within which the tubular stem is rigidly affixed, located and slidable within the tubular body, at least a portion of said guide means being adjacent the slot opening,
   a rotary knob mounted externally upon and threadably engaged to the tubular body adjacent the slot opening, said knob being operatively engaged with the guide means via connection through the slot opening for producing linear movement of the guide means within the tubular body upon rotation of the knob upon the tubular body to project the side opening of the hollow stem outside the packing and withdraw same into the tubular packing to open and close the valve.

2. The apparatus of claim 1 wherein the knob is an internally threaded member rotatable about the tubular body, and said rotatable member is threadably engaged with externally threaded guide means so that rotation of the knob about the tubular body produces the linear movement of the hollow stem.

3. A valve comprising
an enclosing wall defining a tubular body,
lubricated tubular packings in fixed location within each end of the tubular body,
a tubular stem slidably mounted within the tubular body, and the ends of which are located within the accorded openings through the packings, said stem being closed at an end, and provided with a side opening near the closed end, which side opening is extensible through the opening of a packing,
externally threaded guide means located and movable within the tubular opening, said tubular stem extending through and being rigidly mounted within the said guide means,
a slot opening in the enclosing wall defining the tubular body, said guide means being located and movable within the slot opening so that the external threads of the guide means face outwardly through said slot opening,
an internally threaded knob rotably mounted on the tubular body, the threads of which are engaged with those of the guide means, so that rotation of the knob produces linear movement of the tubular stem to open and close the valve.

4. The apparatus of claim 3 wherein the guide means is tapered to define a cross-section, the apex of which is loosely fitted within the threads of the knob.

5. The apparatus of claim 3 wherein the rotatable knob is constructed of two portions, an outer portion and an inner portion, which is internally threaded for engagement with the guide means.

6. The apparatus of claim 3 wherein the tubular body is sectioned to provide a central tubular body upon each end of which is affixed an adaptor provided with central openings which align with the opening accorded through the central tubular body when in place, each of the adaptors being further provided with receptacle openings to accommodate tubular packings.

7. The apparatus of claim 6 wherein the packings are Teflon.

8. The apparatus of claim 6 wherein the lateral movement of the knob is restricted upon the tubular body by the adaptors and rotation of the knob produces only linear movement of the guide means and stem.

9. The apparatus of claim 3 further defined in that the threaded edges of the guide extend through the opening in the wall of the tubular body to engage threadable portions of the knob at two locations 180 degrees apart, the guide means is tapered from the center outwardly to provide a cross-section, the apexes of which are loosely fitted within the threads of the knob to allow vertical and lateral movement therein.

10. The apparatus of claim 9 wherein the guide means is provided with an internally threaded opening through its center, and threadably affixed to the stem.

References Cited
UNITED STATES PATENTS

| | | | |
|---|---|---|---|
| 1,527,926 | 2/1925 | Schopen | 251—340 XR |
| 1,883,960 | 10/1932 | Koppel et al. | 251—341 XR |
| 2,245,097 | 6/1941 | Tobler | 251—340 |
| 2,693,338 | 11/1954 | Grunt | 251—340 |
| 2,985,425 | 5/1961 | Tang | 251—340 |
| 3,291,440 | 12/1966 | Archer et al. | 251—340 XR |
| 3,367,626 | 2/1968 | Stern | 251—340 |

SAMUEL SCOTT, Primary Examiner

Disclaimer and Dedication 3,528,641.—*Rano Joseph Harris, Sr.* and *Joseph Rano Harris, Jr.*, Baton Rouge, La. TUBULAR VALVE. Patent dated Sept. 15, 1970. Disclaimer and dedication filed Feb. 14, 1978, by the inventors.

Hereby disclaim and dedicate to the Public the entire term of said patent.

[*Official Gazette May 30, 1978.*]